United States Patent
Hein et al.

(10) Patent No.: US 11,341,332 B2
(45) Date of Patent: May 24, 2022

(54) SYSTEM FOR AUTOMATED GENERATION OF Q-CODES

(71) Applicant: BAE Systems Information and Electronic Systems Integration Inc., Nashua, NH (US)

(72) Inventors: Ellen N. Hein, San Diego, CA (US); Nazior Rahman, Norwalk, CA (US); Kalyanaraman Vaidyanathan, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 540 days.

(21) Appl. No.: 16/397,308

(22) Filed: Apr. 29, 2019

(65) Prior Publication Data
US 2020/0342058 A1 Oct. 29, 2020

(51) Int. Cl.
| | |
|---|---|
| *G06F 17/00* | (2019.01) |
| *G06F 40/30* | (2020.01) |
| *G06N 20/00* | (2019.01) |
| *G08G 5/00* | (2006.01) |
| *G06F 40/205* | (2020.01) |
| *G06F 40/284* | (2020.01) |

(52) U.S. Cl.
CPC ............ *G06F 40/30* (2020.01); *G06F 40/205* (2020.01); *G06F 40/284* (2020.01); *G06N 20/00* (2019.01); *G08G 5/0034* (2013.01)

(58) Field of Classification Search
CPC ...... G06F 40/30; G06F 40/284; G06F 40/205; G06N 20/00; G08G 5/0034
USPC .......................................................... 701/120
See application file for complete search history.

(56) References Cited

U.S. PATENT DOCUMENTS

| | | | |
|---|---|---|---|
| 7,555,428 B1* | 6/2009 | Franz | G06F 40/284 704/10 |
| 10,440,042 B1* | 10/2019 | Stein | H04L 69/22 |
| 2003/0159113 A1* | 8/2003 | Bederson | G06F 40/109 715/252 |
| 2012/0076413 A1* | 3/2012 | Ferman | G06K 9/00469 382/176 |
| 2012/0096546 A1* | 4/2012 | Dilley | H04L 67/02 726/22 |
| 2012/0274484 A1* | 11/2012 | Zimmer | G08G 5/0013 340/945 |

(Continued)

OTHER PUBLICATIONS

Federal Aviation Administration, Q-Code Subject Categories and Q-Code Combinations, Retrieved from the Internet: https://pilotweb.nas.faa.gov/PilotWeb/displayQcodeCategoryAction.do, Retrieved on Apr. 26, 2019, 1 page.

*Primary Examiner* — Jason T Edwards
(74) *Attorney, Agent, or Firm* — Sand, Sebolt & Wernow LPA; Gary McFaline (57) ABSTRACT

A system for automatic prediction and generation of a Q-Code based on a text description provided in a NOTAM is provided. The present system may be utilized at a top level to generate a Q-Code from a text description or at a mid-level in the flight planning process to verify and/or confirm a human-generated Q-Code based on the text description in a NOTAM. Further, the present disclosure may allow for higher accuracy in the generation of Q-Codes thereby reducing the number of incorrect suboptimal and/or rejected flight plans produced by automatic flight planning systems.

16 Claims, 3 Drawing Sheets

(56) References Cited

U.S. PATENT DOCUMENTS

| | | | |
|---|---|---|---|
| 2015/0199333 A1* | 7/2015 | Nekhay | G06F 40/30 |
| | | | 704/9 |
| 2016/0209234 A1* | 7/2016 | Passinger | G01C 23/00 |
| 2018/0005536 A1* | 1/2018 | Jacquier | G08G 5/0091 |
| 2018/0182250 A1* | 6/2018 | Bonnet | G08G 5/0013 |
| 2018/0285338 A1* | 10/2018 | Mukherjee | G06F 40/253 |

* cited by examiner

SYSTEM FOR AUTOMATED GENERATION OF Q-CODES

TECHNICAL FIELD

The present disclosure relates generally to the field of flight planning. More particularly in one example, the present disclosure relates to a system for automatically generating Q-Codes for use in flight planning. Specifically in another example, the present disclosure relates to automatically generating Q-Codes from the text description contained within a Notice to Airmen (NOTAM) for use in flight planning software.

BACKGROUND

Flight planning is a complicated and time-consuming process that must take into account many different detailed variables to accurately and efficiently generate a viable flight plan. Specifically, flight planning seeks to optimize fuel use and minimize cost of each flight while providing sufficient fuel and data to account for potential problems or delays during the flight. Accordingly, flight planning systems and flight planners look at factors such as aircraft weight, cargo weight, aircraft performance, prevailing weather patterns and conditions, wind speeds, wind direction, and the like. Flight planners further must consider the conditions and activities occurring at the various airports and waypoints along the planned route, including the airport of origin (departure point) and the destination airport (arrival point) for any particular flight. Given the complexity of flight planning and the large number of variables to consider therein, most of flight planning has been automated wherein each of these variables are accounted for via a flight planning system and software. With typical systems, flight plan quality is often more important than specific accuracy and optimality with regards to fuel costs and/or fuel consumption as those may vary depending upon location. Specifically, cost of fuel may vary depending upon where the fuel is purchased. Further the amount of fuel needed for any individual flight is often regulated (relative to the weight of a fully loaded airplane and travel distance) to ensure sufficient fuel to account for variables that cannot be predicted, such as sudden onset of weather, maintenance issues, or the like.

One important variable taken into account by flight planning systems involves the use of Notices to Airmen (NOTAM) which is used to help determine if a generated flight plan is viable and workable. A NOTAM is a document written in a semi-standardized format and issued by an aviation authority to alert pilots and air traffic controllers to potential flight hazards. These NOTAMs are notices that relate to various situations and/or known conditions at a location. For example, if an airport has a runway under construction, a NOTAM may be generated indicating that the particular runway is closed for construction providing date of closure and expected duration and/or reopen date. NOTAMs may be further issued for any known condition or situation relevant to air traffic moving in and out of an area. Some examples of conditions or situations that typically trigger a NOTAM being issued may include changes to procedures, air space restrictions, air hazards, like air shows or balloons, land-based hazards, such as closed runways, runways under maintenance, snow and ice on runways, entertainment hazards, such as planned laser light or fireworks displays, facility changes, and the like. NOTAMs may also be used to notify pilots of ongoing hostilities in a contested area, such as a military runway in an active war zone.

An example NOTAM, shown below, may have a series of lines with each line having a specific purpose. An example NOTAM may read:
A1234/06 NOTAMR A1212/06
Q)EGTT/QMXLC/IV/NBO/A/000/999/
 5129N00028W005
A)EGLL
B)0609050500
C)0704300500
E)DUE WIP TWY B SOUTH CLSD BTN 'F' AND 'R'.
 TWY 'R' CLSD BTN 'A' AND 'B' AND DIVERTED
 VIA NEW GREEN CL AND BLUE EDGE LGT. CTN
 ADZ The first line established the series (A1234) and issue date (2006). The second line, or 'Q-line' provides coded information relating to the condition or hazard presented. The portion of this line in italicized text (emphasis was added to the NOTAM example solely for purposes of this disclosure) is known as the Q-Code, which is a five-letter code beginning with the letter "Q." A Q-Code always starts with the letter "Q" followed by four additional letters with the first two letters following after the Q referring to the subject or object of the NOTAM while the last two letters indicate the condition of the subject or object. According to the example above, the Q-Code is QMXLC which stands for taxiway (MX) closed (LC).

Further information is contained within the NOTAM relating to items such as traffic, the purpose (e.g. to whom the NOTAM is directed), the scope, limits, geographical location, airport/waypoint (aerodrome), effective dates, and the like. The NOTAM further contains a text description of the situation/condition presented in standardized format on the "E-Line" (italicized for emphasis relating to the present disclosure). The E-Line text description, or simply the text description, outlines the specifics of the NOTAM and the recommended actions for a pilot to take, if any. According to this example, the E-Line reads "DUE WIP TWY B SOUTH CLSD BTN 'F' AND 'R'. TWY 'R' CLSD BTN 'A' AND 'B' AND DIVERTED VIA NEW GREEN CL AND BLUE EDGE LGT. CTN ADZ" which translates to "Due to work in progress (WIP), taxiway (TWY) "B South" is closed (CLSD) between (BTN) "F" and "R". Taxiway (TWY) "R" is closed (CLSD) between (BTN) "A" and "B" and is diverted via a new green center line (CL) and blue edge lighting (LGT). Caution (CTN) advised (ADZ)."

When a new NOTAM is issued, the text description and Q-Codes are human generated. As the Q-Code is intended to be a direct representation of the text description, it is then typical that the text description is written first, and then the Q-Code is generated by looking up each letter in a complex list or table of appropriate codes relating to possible situations or conditions. Since the Q-Code is human generated using this complex table, it is common for one of more letters of the Q-Code to be incorrect relative to the actual condition or text description. Having an incorrect Q-Code may significantly alter a generated flight plan depending upon the specific error contained therein; however, any errors in a Q-Code may cause an automated flight planning system to generate a suboptimal or wholly incorrect flight plan. Further, studies have shown that as many as 30% of human generated Q-Codes contain at least one error which may then result in errors or other suboptimal results for a flight plan.

Thus, generally speaking, the current basic processes for generating a flight plan tends to first determine the departure point and the arrival point, as well as waypoints therebetween, which are then cross-referenced with existing NOTAMs using the Q-Codes therein to adjust the flight plan to account for known conditions or situations at any of these locations or any points therebetween. When an incorrect Q-Code is used, flight plans may be altered to take a new route which may change the flight characteristics as well as fuel consumption and the like or may result in a change in departure or arrival location time or the like when a Q-Code is optimal and viable. However, when a Q-Code that is used to alter a flight plan is incorrect, many times the changes to the flight plan or unnecessary or suboptimal.

SUMMARY

The present disclosure addresses these and other issues by providing a system for automatic prediction and generation of a Q-Code based on a text description provided in a NOTAM. The present system may be utilized at a top level to generate a Q-Code from a text description or at a mid-level in the flight planning process to verify and/or confirm a human-generated Q-Code based on the text description in a NOTAM. Further, the present disclosure may allow for higher accuracy in the generation of Q-Codes thereby reducing the number of incorrect suboptimal and/or rejected flight plans produced by automatic flight planning systems.

In one aspect, an exemplary embodiment of the present disclosure may provide a method of automatically generating Q-Codes comprising: creating a Notice to Airmen (NOTAM) with a text description included therein; pre-processing the text description from the NOTAM; applying a learned classifier model to the pre-processed text from the NOTAM; mapping an output from the classifier model to generate a corresponding Q-Code; and displaying the generated Q-Code. This exemplary embodiment or another exemplary embodiment may further provide wherein pre-processing the text description further comprises: extracting the text from the text description of the NOTAM; parsing the extracted text; and one-hot encoding the parsed text. This exemplary embodiment or another exemplary embodiment may further provide wherein the NOTAM contains a Q-Code therein and the method further comprises: comparing the generated Q-Code corresponding to the output from the classifier model to the Q-Code contained within the NOTAM prior to displaying the generated Q-Code. This exemplary embodiment or another exemplary embodiment may further provide selecting a Q-Code from one of the generated Q-Code corresponding to the output from the classifier model and the Q-Code contained within the NOTAM; and displaying the selected Q-Code. This exemplary embodiment or another exemplary embodiment may further provide communicating the generated Q-Code and the NOTAM to a flight planning system for use in developing a flight plan. This exemplary embodiment or another exemplary embodiment may further provide storing the generated Q-Code and the NOTAM for later use instead of displaying the generated Q-Code. This exemplary embodiment or another exemplary embodiment may further provide recalling the stored Q-Code and NOTAM; and communicating the recalled Q-Code and NOTAM to a flight planning system for use in developing a flight plan.

In another aspect, an exemplary embodiment of the present disclosure may provide a method of pre-processing free text comprising: extracting a line of text from a Notice to Airmen (NOTAM); tokenizing the line of text extracted from the NOTAM; removing punctuation words and white space from the line of text; extracting from the line of text any waypoints listed therein using a waypoint dictionary; filtering the line of text to replace abstract numerical values with generic tokens; stemming the remaining words from the line of text; and replacing at least one of the stemmed words with a corresponding abbreviation. This exemplary embodiment or another exemplary embodiment may further provide extracting a Q-Code from the NOTAM during the step of or in succession with the step of extracting the line of text from the NOTAM. This exemplary embodiment or another exemplary embodiment may further provide creating a waypoint dictionary prior to extracting waypoints from the line of text. This exemplary embodiment or another exemplary embodiment may further provide wherein replacing each of the stemmed words further comprises: replacing each of the stemmed words with a corresponding abbreviation selected from a list of approved International Civil Aviation Organization (ICAO) abbreviations. This exemplary embodiment or another exemplary embodiment may further provide generating a Q-Code corresponding to the pre-processed and abbreviated text from the NOTAM. This exemplary embodiment or another exemplary embodiment may further provide training a classifier model to automatically generate the Q-Code corresponding to the pre-processed and abbreviated text from the NOTAM. This exemplary embodiment or another exemplary embodiment may further provide extracting a line of text from a plurality of NOTAMs; and performing each subsequent step on each line of text extracted from the plurality of NOTAMs. This exemplary embodiment or another exemplary embodiment may further provide generating a Q-Code corresponding to each of the pre-processed and abbreviated texts from the plurality of NOTAMs. This exemplary embodiment or another exemplary embodiment may further provide training a classifier model to automatically generate the Q-Code corresponding to each of the pre-processed and abbreviated lines of text from the plurality of NOTAMs. This exemplary embodiment or another exemplary embodiment may further provide extracting a new line of text from a new NOTAM generated subsequent to the training of the classifier model; performing each step from tokenizing the line of text through replacing the stemmed words with abbreviations on the new line of text; and updating the trained classifier model with new pre-processed and abbreviated line of text from the new NOTAM.

In yet another aspect, an exemplary embodiment of the present disclosure may provide a system comprising: a flight planning system operable to generate a flight plan using one or more Q-Codes from a Notice to Airmen (NOTAM); at least one processor capable of executing logical functions in communication with the flight planning system; and at least one non-transitory computer readable storage medium having instructions encoded thereon that, when executed by the processor, implements operations to automatically generate the one or more Q-Codes from a text description contained within a NOTAM, the instructions including: obtain a NOTAM having a text description included therein; extract text from the text description in the NOTAM; parse and pre-process the text from the NOTAM; one-hot encode the parsed and pre-processed text from the NOTAM; apply a learned classifier model to the one-hot encoded text to generate an output; map the output from the learned classifier model to a corresponding Q-Code; and generate a predicted Q-Code corresponding to the text description from the NOTAM. This exemplary embodiment or another exemplary embodiment may further provide wherein the instructions further include: communicate the generated Q-Code to the flight planning system; and generate a flight plan. This exemplary embodiment or another exemplary embodiment may further provide instructions further include: display the flight plan to a pilot with the corresponding NOTAM and generated Q-Code included therewith.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

A system for automated generation of Q-Codes may include a computer or a series of computers having one or more processors, logics, logic controllers, or the like contained therein or operationally connected thereto. The computer and/or processors may be in further communication or connection with one or more non-transitory storage mediums encoding a set of instructions thereon to carry out the processes as described further herein.

The system for automated generation of Q-Codes may be in further communication with one or more flight planning systems. Alternatively, Q-Codes generated by the system herein may be stored for future use by one or more flight planning systems.

The automated generation of Q-Codes may be utilized in flight planning by flight planning systems to account for specific conditions or situations that may exist at the time the flight plan is generated. Typically, the flight planning systems may utilize a Q-Code database, or a Notice to Airmen (NOTAM) database including Q-Codes therein, to identify situations that need to be taken into account when preparing a flight plan. For example, a flight planning system may search a database, such as one provided by the Federal Aviation Administration (FAA) or the International Civil Aviation Organization (ICAO) to select relevant NOTAMs for inclusion in a flight plan based on the expected departure location, arrival location, and flight path desired. These NOTAMs may indicate that a specific scenario exists at one or more of these locations, such as an ongoing weather condition or an ongoing maintenance situation at a destination airfield. Accordingly, flight planning software may utilize this information contained within the Q-Code to properly direct an aircraft and/or the pilot of that aircraft away from the situation as necessary.

Current flight planning systems tend to be automated through employment of one or more computer systems which are connected to various severs and databases to populate the flight plan with data relating to the particular aircraft payload and prevailing weather conditions, as well as other factors such as the NOTAMs and Q-Codes or other relevant information contained therein. These databases may be hosted on remote servers or through the Internet and the associated flight planning systems may access those automatically or alternatively when prompted by a software user.

Such flight planning systems may be integral with other flight systems and processes in that the flight plan, once approved, may prompt other automated or manual actions to be taken, such as fueling an aircraft with a specific volume of fuel or increasing or reducing a payload carried by an aircraft.

As discussed previously, Q-Codes are generated based on an existing condition or scenario wherein a human must cross-reference a complex lookup table to generate the letters populating each position of the Q-Code corresponding to the existing condition. As much as 30% of Q-Codes are found to have at least one error contained therein making them suboptimal and/or unreliable for flight planning as is.

Standard practice in flight planning is that once a flight plan has been generated, it is typically delivered to the pilot and/or flight crew for review and approval. When a flight plan is rejected for any reason, a new flight plan must be generated to replace the rejected flight plan resulting in increased expense and time. If significant errors exist in the flight plan, the actual flight itself may be affected. Further, if a flight plan is accepted but contains an error related to a Q-Code, the flight itself may be suboptimal at best and hazardous at worst.

Figure 1:
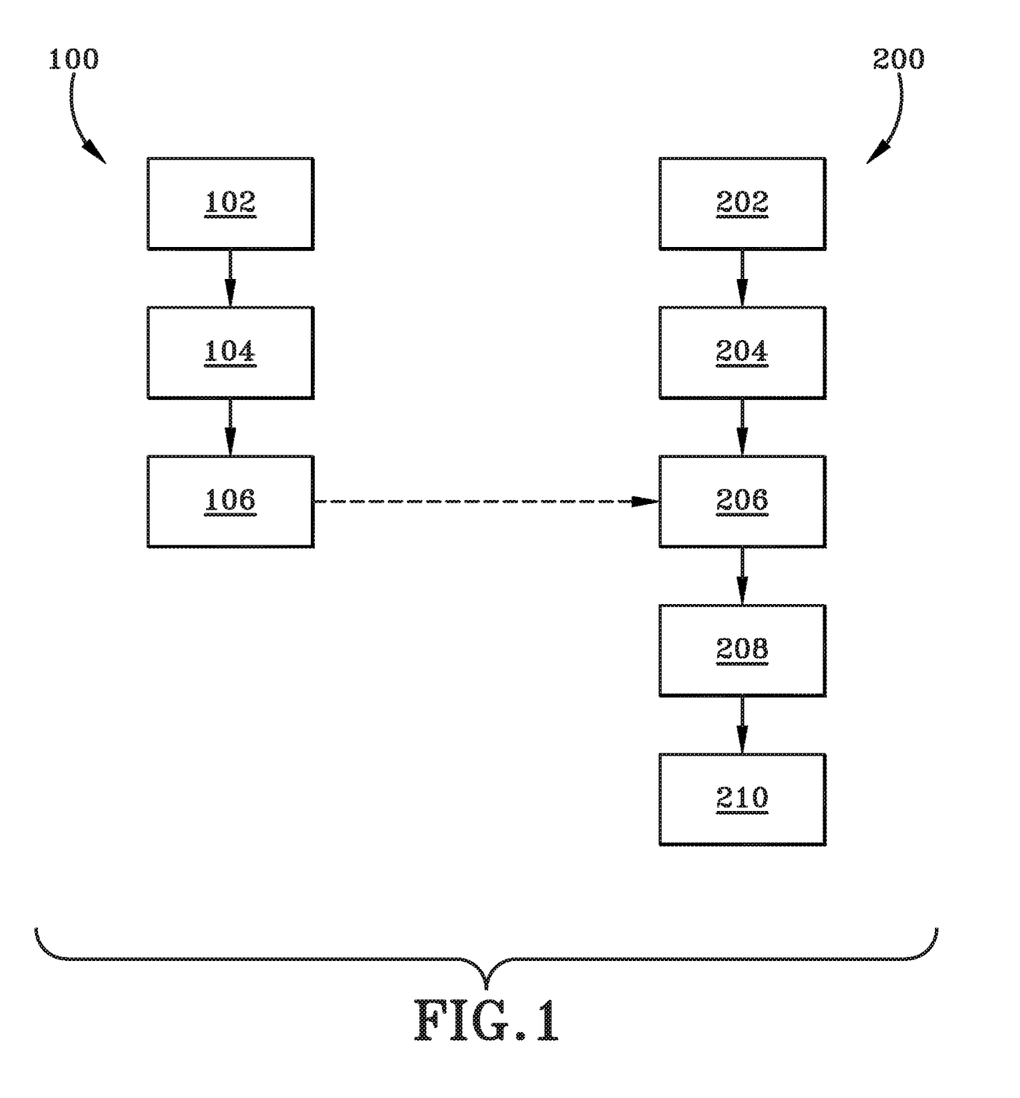
FIG. 1 is a flow chart representation of a process for training a classifier model and a process for the implementation of the trained classifier model.
Figure 2:
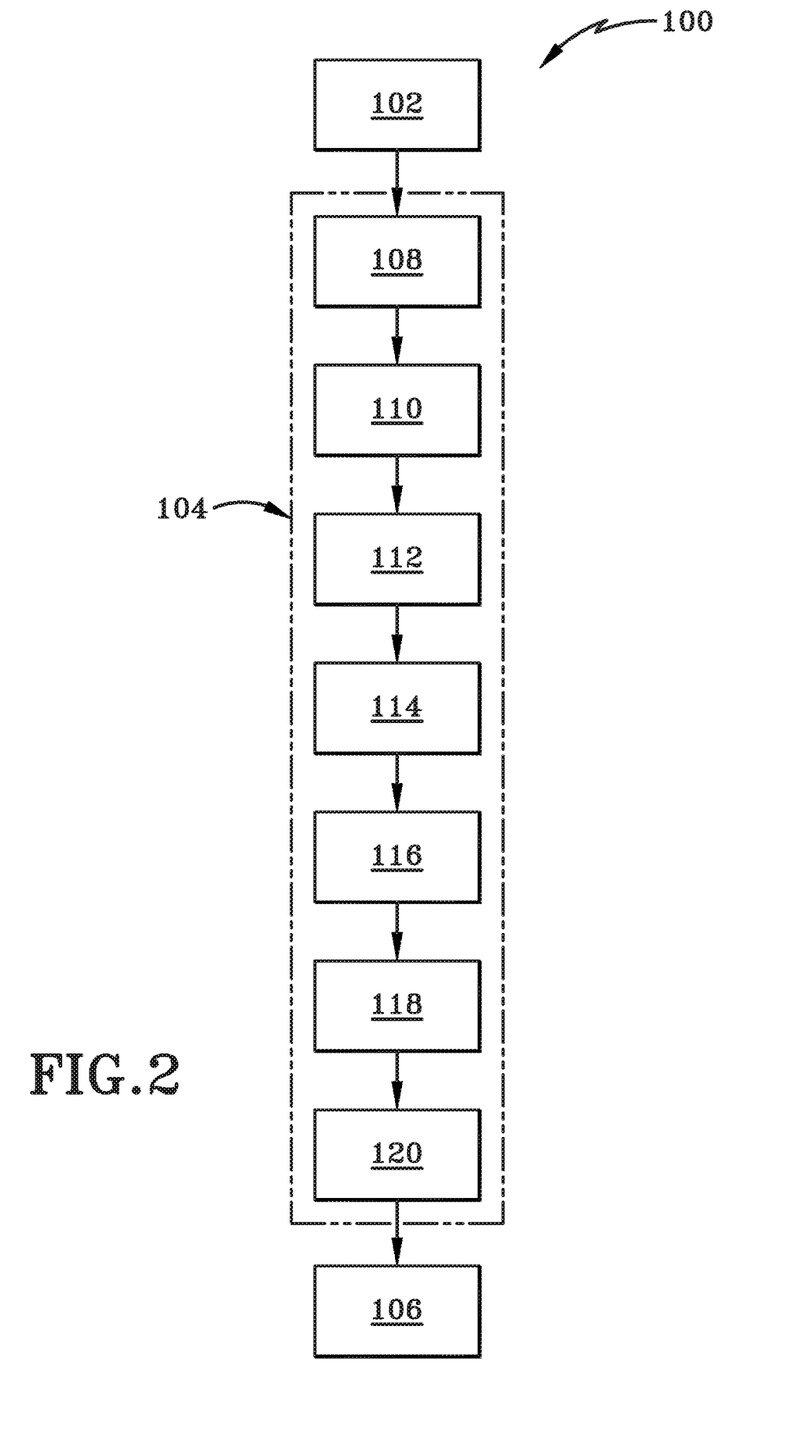
FIG. 2 is a flow chart representation of a process for training the classifier model with additional sub-steps presented therein.
Figure 3:
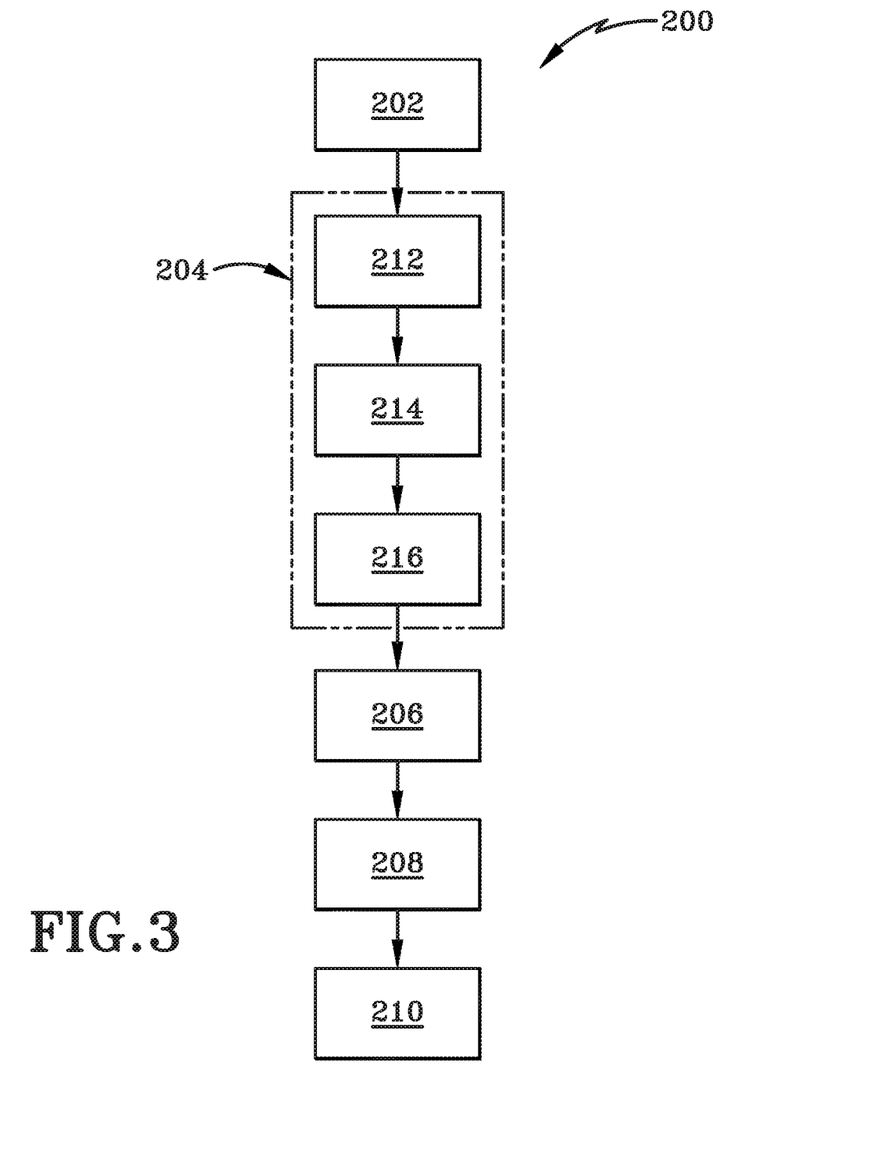
FIG. 3 is a flow chart representation of a process for implementation of a trained classifier model with additional sub-steps presented therein.

With reference now to FIGS. 1-3, various flowcharts are depicted therein to further illustrate a process for training a classifier model indicated as process 100 as well as the application of the classifier model for the automated generation of Q-Codes indicated as process 200. As depicted in FIG. 1, process 100 may have three general steps, which will be discussed further herein, while process 200 may include five generalized steps as discussed below.

Process 100 may be a teaching process wherein the classifier model may be trained to parse the text description from a NOTAM to then automatically generate and predict the most appropriate or most accurate Q-Code therefrom. Process 100 may first begin training the classifier model by gathering a plurality of NOTAMs with corresponding Q-Codes contained therein. This step may be indicated in the figures as reference 102. The second general step of process 100 may be to pre-process the NOTAMs to both tokenize and parse text descriptions therein as well as to check these existing NOTAMs for correctness prior to feeding them into the classifier model for training. The pre-processing of NOTAMs is indicated at step 104 and discussed more thoroughly below. Once the NOTAMs with corresponding Q-Codes have been gathered and pre-processed according to steps 102 and 104, the classifier model may then be trained to generate Q-Codes according to the text descriptions found within a NOTAM. The actual training of the classifier model may be indicated as step 106.

The gathering of NOTAMs with corresponding Q-Codes 102 is important as these NOTAMs will form the basis of the learning taking place by the classifier model in later step 106. NOTAMs may be gathered from any issuing authority, including the U. S. Department of Defense Aeronautical Information portal, the Defense Internet NOTAM Service (DINS), the FAA, or the ICAO. For training purposes, in process 100, the age and/or status (i.e. active or expired) of each NOTAM is unimportant provided each NOTAM includes a Q-Code corresponding to the text description contained therein. The age and status is unimportant because the relative dates and times of the NOTAM's issuance are not necessary for the classifier model to learn and properly generate an automated Q-Code based on the text description. Thus, by utilizing these sources and other NOTAM related services, a significant number of NOTAMs may be available to thoroughly train a classifier model under process 100.

The NOTAMs are written in a semi-standardized format and are filed by one of these above aviation authorities to alert pilots and air traffic controllers to potential flight hazards. Normally, there are two main civil NOTAM formats, namely, the domestic format, which is used in the Northwest Hemisphere, and the international or ICAO format, used throughout the remainder of the world. The United States Air Force has a third NOTAM format informally called C4NOTAM which stands for Command, Control, Communications, and Computer Notices to Airmen.

As the ICAO international format is most widely used, the classifier model trained by process 100 and utilized in the automated generation of Q-Codes from process 200 discussed herein may be taught using the ICAO format for NOTAMs; however, it will be understood that the classifier model may be taught using any or all NOTAM formats to properly and accurately generate an automated Q-Code from any future NOTAMs produced in any or all of these formats.

With reference to FIG. 2, in order for the classifier model to be taught to generate a Q-Code from standardized text, the text must first be tokenized, filtered, and have features extracted to parse the text for use in the classifier model. Therefore, once the NOTAMs are gathered in step 102, they must be fully parsed and pre-processed in step 104. Doing so requires several sub-steps to be performed on the text prior to training the classifier model.

First, the NOTAMs are received from one of the above sources and the Q-Code and E-Line representing the text description need to be extracted from the relative NOTAM text. The extraction of the Q-Code and E-Line from the NOTAM may take place as sub-step 108 of step 104. Next, the text description from the NOTAM contained in the E-Line may be tokenized into individual words while removing periods, hyphens, dashes, and the like between words and adding a space between words and numbers contained within the description text. The tokenization of the E-Line text may be performed as sub-step 110. Next, in sub-step 112, words consisting entirely of punctuation marks, or punctuation words, and white space are removed from the tokenized E-Line text. Such punctuation words may include, for example, the periods at the end of a sentence.

At this point, a waypoint dictionary may be created utilizing the GPX aviation waypoint generator, which is a publicly available tool found at navaid.com/gpx. The waypoint dictionary may be a data base file utilizing GPS data to fetch the names of waypoint types, such as airport, waypoint, mil-waypoint, heliport platform, and CNF or computer navigation fix. The waypoint dictionary may then be used to add tokens to the parsed NOTAM text to signify if the NOTAM potentially contains a waypoint within the text. The word of the text is not replaced with a token because some waypoints may also be a commonly ICAO abbreviation. For example, the airport located in Flat, Ak., is abbreviated FLT which is also an ICAO abbreviation for the term "flight." Therefore, replacing a word in the text description with waypoints may cause a loss of information that may compromise the accuracy of an automatically generated Q-Code later on. The extraction of waypoints may be indicated as sub-step 114 of step 104.

In sub-step 116, the tokenized words may be filtered and items, such as dates, numbers, coordinates, and measurements, may be replaced with tokens. Specifically, these are not typically used as most trained classifier models, such as the one disclosed herein, do not have the capacity or capability to recognize abstract concepts like numbers, dates, and measurements instead of exact values. Therefore, these particular tokenized words may be replaced with general tokens, for example, "IS_NUMBER", "IS_HEADING", "IS_ALPHA_NUM", "IS_DISTANCE", or the like.

Sub-step 118 of step 104 is to stem the words, which is the process of reducing words to their word stem base or root form. For example, the words circle, circling, circled, and circles all become "CIRC." According to one aspect, the land caster stemming algorithm may be used as it is known for its speed and aggressive stemming. According to another aspect, any suitable stemming algorithm may be employed to stem the tokenized words within the E-Line text.

Finally, in sub-step 120, words are replaced with their corresponding ICAO abbreviations to simplify the vocabulary of the NOTAM. The ICAO abbreviation dictionary is a standardized dictionary form available from the ICAO. Further, in sub-step 120, any words containing digits may be dropped from the abbreviated text to further simplify the vocabulary of the NOTAM.

The completion of sub-step 120 marks the completion of the pre-processing step 104 wherein the text description or E-Line from the NOTAMs gathered in step 102 are fully parsed and are prepared to be fed into the classifier model to train the classifier model to generate Q-Codes. As with any machine learning or teaching system, the higher number of inputs available, the more accurate and precise the learned model will become. Therefore, it is understood and contemplated that a large number of NOTAMs may be gathered and pre-processed according to steps 102 and 104 of process 100 before training the classifier model in step 106. Further, as new NOTAMs are released; periodic updates to the classifier model may be performed utilizing process 100 to feed additional NOTAMs into the classifier to achieve ongoing learning and training of the classifier model with additional NOTAM references as they become available.

With reference to FIG. 3, the automated generation of a Q-Code according to process 200 is shown in a more detailed flowchart format. Process 200 assumes that process 100 has been completed and the classifier model has been fully trained and is operable to generate an automated Q-Code according to process 200 described herein. The trained classifier model is applied in step 206 of process 200 as discussed further below (and as seen in FIG. 1); however, certain steps must first occur before the application of the trained classifier model in step 206 takes place. Specifically, a new NOTAM must be generated or released from an aviation authority such as the ICAO, FAA, or other authorities as discussed above. The new generation of a NOTAM may take one of two forms. First, it may be a complete NOTAM having both human generated text descriptions in the E-Line, as well as a human produced Q-Code. According to processes and methods in this particular scenario, the end product of process 200 may be a verification or generation of a Q-Code which may be compared to the human generated Q-Code for accuracy and/or flight planning purposes. The generation of a new NOTAM is indicated as step 202 in process 200 and triggers the remainder of process 200 to occur.

Next, general step 204 of process 200 requires some management of the text in the new NOTAM prior to being run through the classifier model. This text management is similar to, but may be an abbreviated version of the pre-processing that may occur during step 104 of the learning process 100. Specifically, as seen in FIG. 3, the processing of the NOTAM text in step 204 may first include sub-step 212 which is extracting the free text from the NOTAM. The free text may then be parsed and pre-processed in step 214 before being one-hot encoded according to a separate dictionary in sub-step 216. The one-hot encoding dictionary may be generated during the training process 100 or may be generated separately therefrom at any time and provided for use with process 200 as dictated by the desired implementation thereof. The sub-step of one-hot encoding of the parsed text in sub-step 216 may further result in the generation of an encoded matrix which may then be run through the classifier model in step 206.

Once the one-hot encoded matrix is run through the model in step 206, the model output may be mapped to the corresponding Q-Code letters in step 208 using any suitable prediction model or methods. According to one aspect, the model output may be mapped to the corresponding Q-Code using a 1-2 gram representation method. According to another aspect, any other suitable prediction model may be used, including tone frequency methods, 1 gram methods, or the like. Once the model output is mapped to a corresponding Q-Code in step 208, a predicted Q-Code may be generated and/or displayed in step 210.

According to one aspect, the learned classifier model may predict more than one Q-Code that may correspond to the text from a specific NOTAM. In these instances, the most accurate, or more specifically, the Q-Code with the highest correlation to the text from that NOTAM may be selected for display. Where the learned classifier model is implemented for use with NOTAMs that already contain a human generated Q-Code, the automatically generated Q-Codes may be compared to the human generated Q-Code and one of the Q-Codes may be selected for display according to the accuracy and/or correlation between the selected Q-Code and the text from the NOTAM. Alternatively, the Q-Code chosen for display may be selected according to any other reason as dictated by the desired implementation. For example, the Q-Code may be selected by the highest correlation, the most common code for similar scenarios, or may be chosen for display according to any other suitable rationale.

Step 210, or more particularly the displaying of the predicted Q-Code may have multiple formats. According to one aspect, the predicted Q-Code may be generated and shown directly to a pilot via a monitor or display unit. According to another aspect, the predicted Q-Code may be communicated audibly to a pilot, air traffic controller, or the like. According to another aspect, the Q-Code may be included in a printed document.

Alternatively, Q-Codes generated by process 200 may be stored for future use along with their corresponding NOTAMs. According to another aspect, Q-Codes may be directly communicated or input into flight planning systems for use in preparing a flight plan.

Having thus presented the processes for training and implementing the trained classifier model, the use thereof may be best illustrated through the following non-limiting examples. For a first example, where the implementation of the classifier model is contemplated to be employed at the top level, i.e., at the creation of the Q-Code stage, a human operator may generate the E-Line or the text description of the NOTAM which may be parsed and fed through the classifier model to ultimately generate the predicted Q-Code from the text. In this example, the classifier model, having been trained on the plurality or NOTAMs according to process 100, may be utilized by the person or aviation authority tasked with generating the NOTAM itself. That person or authority may be made aware of a situation worthy of issuing a NOTAM, for example, a closed runway, and may start by generating the text description for the E-Line. Then, rather than spending the time to search through the complex lookup tables, that person or authority may utilize process 200 to extract the free text from the E-Line description 212, parse and preprocess that text 214 and one-hot encode that text 216 before running it through the trained classifier model 206. Once the E-Line text has been run through the classifier model 206, the output may be mapped to a corresponding Q-Code and that Q-Code may be generated and displayed 210. The person or authority may now marry that automatically generated Q-Code to the NOTAM and may issue the NOTAM as normal, and/or may upload the NOTAM into the aviation authority's database for future use by flight planning systems.

Alternatively, in a second example the implementation may employ the trained classifier model to generate a Q-Code from an issued NOTAM. This example then contemplates that a person or aviation authority has already created, issued, or otherwise made available a NOTAM with a text description and a Q-Code already contained therein. Accordingly, the predicted Q-Code or generated Q-Code from step 210 may be compared to the human generated Q-Code in the NOTAM for confirmation and/or amendment as necessary. This exemplary implementation may be utilized by an aviation authority to verify Q-Codes prior to issuing the NOTAM or may be used by flight planning systems to verify a NOTAM received from an aviation authority. Thus, once the predicted Q-Code is generated, it may be first verified before being further communicated to or otherwise employed with the flight planning system to further assist in preparing a flight plan.

Regardless of the particular implementation, it will be understood that the automated generation of Q-Codes according to processes 100 and 200 as discussed herein will lower the probability of errors contained in a flight plan or the rejections thereof. Further, the reduction of errors in Q-Codes may result in more efficient, more viable, and/or more reliable flight plans being generated from these flight planning systems.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of automatically generating Q-Codes comprising:
   creating a Notice to Airmen (NOTAM) with a text description included therein;
   pre-processing the text description from the NOTAM;
   wherein pre-processing the text description from the NOTAM comprises the steps of:
      extracting a line of text from the NOTAM;
      tokenizing the line of text extracted from the NOTAM;
      removing punctuation words and white space from the line of text extracting from the line of text any waypoints listed therein using a waypoint dictionary;
      filtering the line of text to replace abstract numerical values with generic tokens;
      stemming the remaining words from the line of text;
      replacing at least one of the stemmed words with a corresponding abbreviation;
   applying a learned classifier model to the pre-processed text from the NOTAM;
   mapping an output from the classifier model to generate a corresponding Q-Code; and
   displaying the generated Q-Code.

2. The method of claim 1 wherein pre-processing the text description further comprises:
   extracting the text from the text description of the NOTAM;
   parsing the extracted text; and
   one-hot encoding the parsed text.

3. The method of claim 2 wherein the NOTAM contains a Q-Code therein and the method further comprises:
   comparing the generated Q-Code corresponding to the output from the classifier model to the Q-Code contained within the NOTAM prior to displaying the generated Q-Code.

4. The method of claim 3 further comprising:
   selecting a Q-Code from one of the generated Q-Code corresponding to the output from the classifier model and the Q-Code contained within the NOTAM; and
   displaying the selected Q-Code.

5. The method of claim 2 further comprising:
   communicating the generated Q-Code and the NOTAM to a flight planning system for use in developing a flight plan.

6. The method of claim 2 further comprising:
   storing the generated Q-Code and the NOTAM for later use instead of displaying the generated Q-Code.

7. The method of claim 6 further comprising:
   recalling the stored Q-Code and NOTAM; and
   communicating the recalled Q-Code and NOTAM to a flight planning system for use in developing a flight plan.

8. A method of pre-processing free text comprising:
   extracting a line of text from a plurality of Notice to Airmen (NOTAMs);
   tokenizing the line of text extracted from the NOTAMs;
   removing punctuation words and white space from the line of text;
   extracting from the line of text any waypoints listed therein using a waypoint dictionary;
   filtering the line of text to replace abstract numerical values with generic tokens;
   stemming the remaining words from the line of text;
   replacing at least one of the stemmed words with a corresponding abbreviation;
   generating a Q-Code corresponding to each of the pre-processed and abbreviated texts from the plurality of NOTAMs;
   training a classifier model to automatically generate the Q-Code corresponding to each of the pre-processed and abbreviated lines of text from the plurality of NOTAMs;
   extracting a new line of text from a new NOTAM generated subsequent to the training of the classifier model;
      performing each step from tokenizing the line of text through replacing the stemmed words with abbreviations on the new line of text; and
      updating the trained classifier model with new pre-processed and abbreviated line of text from the new NOTAM.

9. The method of claim 8 further comprising:
   extracting a Q-Code from the NOTAM during the step of or in succession with the step of extracting the line of text from the NOTAM.

10. The method of claim 8 further comprising:
    creating a waypoint dictionary prior to extracting waypoints from the line of text.

11. The method of claim 8 wherein replacing each of the stemmed words further comprises:
    replacing each of the stemmed words with a corresponding abbreviation selected from a list of approved International Civil Aviation Organization (ICAO) abbreviations.

12. The method of claim 8 further comprising:
    generating a Q-Code corresponding to the pre-processed and abbreviated text from the NOTAM.

13. The method of claim 12 further comprising:
    training a classifier model to automatically generate the Q-Code corresponding to the pre-processed and abbreviated text from the NOTAM.

14. A flight planning system comprising:
    at least one processor capable of executing logical functions in communication with a flight planning system; and
    at least one non-transitory computer readable storage medium having instructions encoded thereon that, when executed by the processor, implements operations to automatically generate the one or more Q-Codes from a text description contained within a NOTAM, the instructions including:

obtain a NOTAM having a text description included therein;

extract text from the text description in the NOTAM;

parse and pre-process the text from the NOTAM;

wherein pre-processing the text description from the NOTAM comprises the steps of:

extracting a line of text from the NOTAM;

tokenizing the line of text extracted from the NOTAM;

removing punctuation words and white space from the line of text extracting from the line of text any waypoints listed therein using a waypoint dictionary;

filtering the line of text to replace abstract numerical values with generic tokens;

stemming the remaining words from the line of text;

replacing at least one of the stemmed words with a corresponding abbreviation;

one-hot encode the parsed and pre-processed text from the NOTAM;

apply a learned classifier model to the one-hot encoded text to generate an output;

map the output from the learned classifier model to a corresponding Q-Code; and generate a predicted Q-Code corresponding to the text description from the NOTAM.

15. The system of claim 14 wherein the instructions further include:

communicate the generated Q-Code to the flight planning system; and generate a flight plan.

16. The system of claim 15 wherein the instructions further include:

display the flight plan to a pilot with the corresponding NOTAM and generated Q-Code included therewith.

\* \* \* \* \*